(12) United States Patent
Haussmann

(10) Patent No.: US 7,606,381 B2
(45) Date of Patent: Oct. 20, 2009

(54) METHOD FOR MANUFACTURING AN EAR DEVICE HAVING A RETENTION ELEMENT

(75) Inventor: Mathias Haussmann, Zurich (CH)

(73) Assignee: Phonak AG, Staefa (CH)

( * ) Notice: Subject to any disclaimer, the term of this patent is extended or adjusted under 35 U.S.C. 154(b) by 838 days.

(21) Appl. No.: 11/019,613

(22) Filed: Dec. 23, 2004

(65) Prior Publication Data

US 2006/0140430 A1    Jun. 29, 2006

(51) Int. Cl.
*H04R 25/00* (2006.01)
(52) U.S. Cl. .................................. 381/322; 381/328
(58) Field of Classification Search ................ 381/322, 381/324, 328, 330; 700/97, 98, 118, 163; 703/1; 181/129, 130, 135; 29/896.1, 896.21
See application file for complete search history.

(56) References Cited

U.S. PATENT DOCUMENTS

| 6,533,062 | B1 | 3/2003 | Widmer et al. |
| 6,731,997 | B2 | 5/2004 | Hessel et al. |
| 6,766,878 | B2 * | 7/2004 | Widmer et al. ............... 181/135 |
| 6,920,414 | B2 * | 7/2005 | Tøpholm ........................ 703/1 |
| 2003/0133583 | A1 | 7/2003 | Widmer et al. |

FOREIGN PATENT DOCUMENTS

| EP | 1 246 506 A1 | 10/2002 |
| EP | 1 248 237 A2 | 10/2002 |
| EP | 1 345 470 A2 | 9/2003 |
| EP | 1 414 271 A2 | 4/2004 |
| WO | WO 02/071794 A1 | 9/2002 |

* cited by examiner

*Primary Examiner*—Huyen D Le
(74) *Attorney, Agent, or Firm*—David S. Safran; Roberts Mlotkowski Safran & Cole, P.C.

(57) ABSTRACT

The invention relates to a method for manufacturing a first ear device having (12) a first retention element (14) to be worn at least in part in at least one of the outer ear and the ear canal of a user and a second ear device (12') having a second retention element (14') to be worn at least in part in at least the outer ear and the ear canal of the user, comprising: defining a data format; measuring the inner shape of the user's outer ear and ear canal; manufacturing the first retention element, wherein the outer surface of the first retention element is individually shaped according to the measured inner shape of the user's outer ear and ear canal; obtaining a digital data set according to the data format, which is representative of the measured inner shape of the user's outer ear and ear canal; providing the user with a personal copy of the digital data set for personal use by the user; and using the personal copy of the digital data set for manufacturing the second retention element, wherein the outer surface of the second retention element is individually shaped according to the measured inner shape of the user's outer ear and ear canal.

6 Claims, 2 Drawing Sheets

METHOD FOR MANUFACTURING AN EAR DEVICE HAVING A RETENTION ELEMENT

BACKGROUND OF THE INVENTION

1. Field of the Invention

The invention relates to a method for manufacturing an ear device having a retention element to be worn at least in part in at least one of the outer ear and the ear canal of a user, such as a hearing protection earplug.

2. Description of Related Art

US 2003/0133583 A1 relates to a process for manufacturing a customized shell of a hearing device, in particular a hearing aid, wherein the inner shape of the user's outer ear and ear canal is measured, a three dimensional (3D) digital data set representative of the measured inner shape of the user's outer ear and ear canal is obtained, the 3D data set is transmitted to a production center either on a disk or via the internet, and the customized shell having a outer surface with a shape corresponding to the measured inner shape of the user's outer ear and ear canal is manufactured by an additive layer-by-layer build-up process such as selective laser sintering of a powder material or laser lithography. Individual user data is stored and managed in a centralized manner. If a shell has to be replaced it can be reproduced by retrieving the stored individual data sets.

U.S. Pat. No. 6,731,997 B2 relates to a similar process, wherein an individual data set is gathered for each user, comprising information regarding the individual user's audio needs such as hearing loss data, information regarding the 3D shape of the user's outer ear and ear canal and information regarding the individual user's non-audio needs. The individual user's data set is input into a computer system comprising a local computer and a remote computer, for example, by the user of the hearing device via an internet-kind network or via a data carrier such as CD or tape. The 3D shape data of the user's outer ear and ear canal is obtained by taking an impression of the ear, which then undergoes scanning; alternatively, the user's ear is directly scanned. When an existing hearing device has to be repaired or updated, the 3D shape data is retrieved from a database in which such data is stored. Based on the gathered individual user's data set the shell of the hearing device is manufactured by an additive layer-by-layer build-up process.

EP 1 414 271 A2 relates to a hearing aid to be worn within the user's ear canal, which comprises a data memory into which data regarding the inner shape of the user's outer ear and ear canal having been determined by taking an impression of the user's ear is stored. Such data stored in the hearing aid may be used for adapting the hearing aid to the individual user.

It is a first object of the invention to provide for a method for manufacturing ear devices having a retention element with an outer surface individually shaped according to the inner shape of the user's outer ear and/or ear canal, wherein the method should be simple, flexible and fast.

It is a further object of the invention to provide for a method for manufacturing an ear device having a retention element to be worn at least in part in the outer ear and/or ear canal of a user, wherein the method should be simple but nevertheless should provide for an optimized fit of the retention element within the user's outer ear and/or ear canal.

SUMMARY OF THE INVENTION

According to the invention, the first object is achieved by a manufacturing method as defined in claim 1. This solution is beneficial in that, by providing the user with a personal copy of a digital ear shape data set for personal use by the user and using this personal copy of the digital data set for manufacturing the second retention element of the second ear device, the user is given the option to use his personal copy of the ear shape data set for purchasing additional ear devices, i.e. ear devices in addition to the first ear device, which can be produced in a particularly simple and flexible manner without the need of further scanning or impression-taking of the user's ear. Thereby the user may purchase such additional ear devices even from different manufactures provided that the data format of his personal copy of the digital data set is standardized. In particular, the personal copy of the digital data set may be used for purchasing ear devices of different types and functionality. Further, by using his personal copy of the digital data set, the user may purchase an additional ear device on-line, for example via the internet without the need of an on-site session for measuring the shape of the user's outer ear and ear canal. The step of providing the user with his personal copy may be realized by permanently storing a personal copy of the digital data set in a manner so as to be accessible by the user.

According to the invention, the second object is achieved by a manufacturing method as defined in claim 21. This solution is beneficial in that, by estimating the actual shape of the user's outer ear and/or ear canal from a model based on sampled statistical data regarding changes of ear anatomy caused by aging, the user may be provided with an ear device having a retention element which has an outer surface which is particularly well adapted to the actual inner shape of the user's outer ear and ear canal without the need to have available or to have performed a measurement of the shape of the user's outer ear and ear canal which represents the state of the user's outer ear and/or ear canal shortly before the ear device is manufactured. Rather it would be sufficient to have available measured data of the shape of the user's outer ear and ear canal dating from a date much earlier than the date at which the ear device is to be manufactured. Consequently, if the shape of the user's outer ear and ear canal already had been measured at least once, for example, for manufacturing a first customized ear device, further ear devices could be manufactured in a particularly simple manner without the need of an additional measurement of the shape of the user's outer ear and ear canal, while nevertheless achieving optimized individual fit of the ear device within the user's outer ear and ear canal.

These and further objects, features and advantages of the present invention will become apparent from the following description when taken in connection with the accompanying drawing which, for purposes of illustration only, show several embodiments in accordance with the present invention.

BRIEF DESCRIPTION OF THE DRAWINGS

FIG. 1 shows a schematic process for manufacturing a first ear device having a first retention element to be worn at least in part in the outer ear and/or ear canal of a user. Preferably, the ear device is a hearing protection earplug and the retention element is a customized shell, i.e. a shell having an outer surface individually shaped according to the measured inner shape of the user's outer ear and/or ear canal, in order to optimize fit of the shell within the user's outer ear and/or ear canal.

Figure 1:
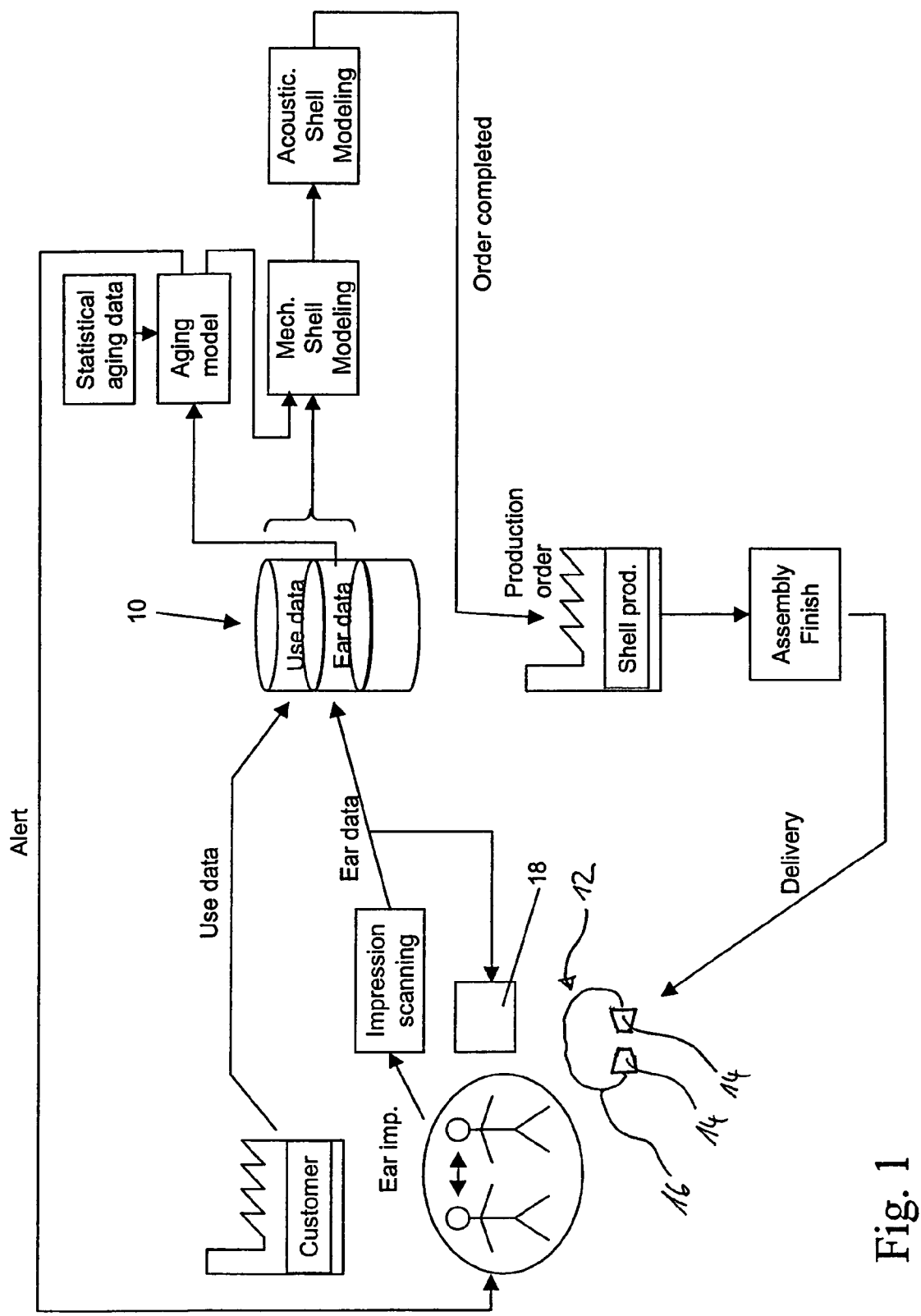
FIG. 1 shows a schematic view of a process for manufacturing a first ear device.

As a first step, data regarding the desired use, i.e. the desired function, of the ear device and regarding the individual shape of the user's outer ear and/or ear canal is to be collected. If the ear device is a hearing protection earplug, as in the example of FIG. 1, the use data usually will include data regarding the expected noise exposure such as duration, sound pressure level and frequencies, a regulation regarding noise exposure protection, communication needs of the user when wearing the earplug in noisy environments, existing hearing loss of the user, etc. Such use data may be provided by the user himself or by his company.

The ear shape data may be obtained by taking an impression of the user's outer ear and ear canal and subsequently scanning the impression or, alternatively, directly scanning the user's ear. Preferably, the scanning process in both cases is a laser scanning process. The direct (in-vivo) scanning or the impression-taking of the user's ear may be carried out at the earplug manufacturer's site, at the location of a consultant or a retailer, or at a site of the company for which the user works, for example during a hearing protection device delivery in the user's company. Further, the measuring of the user's ear shape might be carried out during events like a military physical inspection, a blood donation, a doctor visit, etc. In the case of direct (in-vivo) scanning of the user's ear, the 3D ear data is directly obtained at the place where the direct scanning process is carried out. In the case in which an impression is taken, the scanning of the impression may occur at the place where the impression has been taken or at a different place, if the impression is physically shipped to the impression scanning place. Thus impression scanning may take place at the manufacturer's site, while the impression has been taken at, for example, the user's company.

Both that 3D ear data and the use data will be transmitted to a data storage means 10, i.e. a database accessible by the manufacturer of the ear device. The use data and the 3D ear data are used for modeling the mechanical features, e.g. size, shape, receptacles for electronic components, etc., and the desired acoustic features, e.g. frequency dependent acoustic attenuation, of the shell of the ear device. The output of this modeling process is the mechanical shape of the shell and the type and setting of additional components to be mounted at the shell, i.e. all parameters necessary for producing the ear device.

This data is used for producing the shell by an additive layer-by-layer build-up process. Such processes are also known as "rapid prototyping". A preferred additive build-up process is a layer-by-layer laser sintering process of powder material, preferably polyamide powder. Such processes are also known as "selective laser sintering" (SLS). The basic principle therein is the repeated deposition of a thin layer of material on a surface, with the desired sectional shape then being stabilized, i.e. hardened, by laser action. Other preferred additive layer-by-layer build-up processes are laser stereo-lithography or photo-polymerization. An overview regarding additive layer-by-layer build-up processes for producing customized shells for hearing aids can be found, for example, in US 2003/0133583 A1 or U.S. Pat. No. 6,533,062 B1.

Preferably, the shell is produced by selective laser sintering of a polyamide powder, resulting in an elasticity of the shell of from shore D 85 shore D 65. Further, the shell is preferably designed such that it provides for an acoustic attenuation of at least 10 dB averaged over the audible frequency range when the shell is worn by the user.

The shell then undergoes finishing, for example by mounting active electronic components, such as a microphone, an audio signal processing unit and a speaker of an active hearing protection unit, at the shell in order to produce the ear device, i.e. the hearing protection earplug, which subsequently is delivered as the product 12 to the user, where it may undergo a final fitting/configuration process before being used. The product 12 typically comprises two hearing protection earplugs 14 connected by a cord 16 for preventing loss of the earplugs 14.

According to one aspect of the invention, the user is not only supplied with the product 12 but in addition with a personal copy 18 of the measured 3D ear data for personal use by the user. Physically, this personal copy of the ear data may be provided as a personal mobile data carrier on which the digital 3D ear data is permanently stored, with the personal mobile data carrier being delivered to the user. The mobile data carrier may include a semiconductor memory for storing the 3D ear data. The semiconductor memory may be part of a smart card, a mobile phone, a personal digital assistant, or a portable computer. However, also other data carriers may be used, such as a floppy disc, a CD or a DVD. Alternatively, the personal copy of the 3D ear data may be provided by storing the ear data on a stationary data carrier which is accessible by the user. Such stationary data carrier may be, for example, a home personal computer of the user or a database which is remotely accessible by the user. When the personal copy is provided on a stationary data carrier, the data is transmitted to the stationary data carrier by the manufacturer, for example, via the internet or another network. Also in the case in which the personal copy is finally stored on a mobile data carrier the data first may be provided via the internet or a similar network to a data write device accessible by the user in order to permanently store the ear data on the mobile data carrier.

If the ear shape is measured by direct scanning of the ear or by taking an impression which is scanned at the place where the impression has been taken, the user preferably is provided with the personal copy of the measured ear data already at the place where the ear is scanned or the impression is taken.

Figure 2:
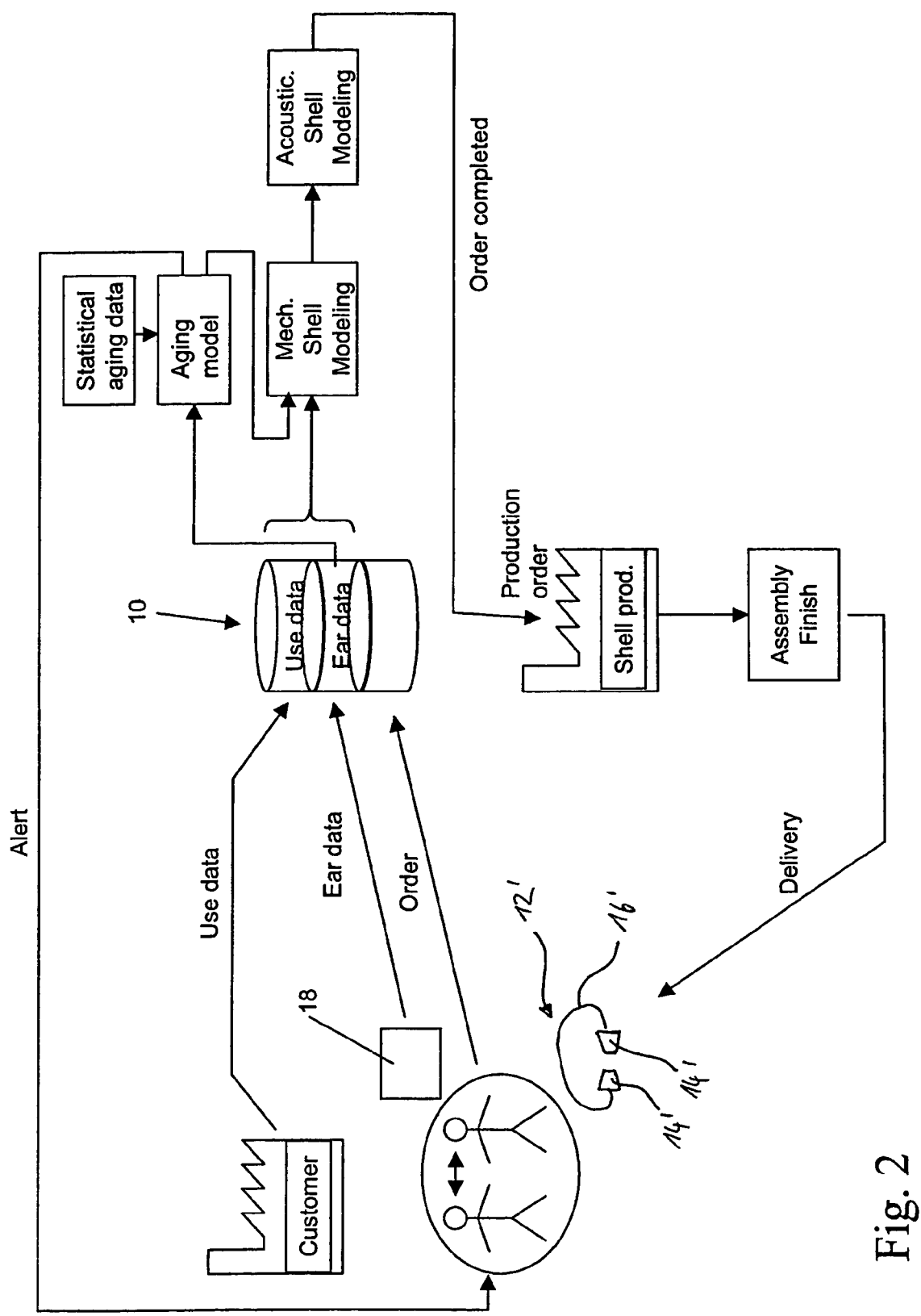
FIG. 2 shows a schematic view of a process for manufacturing a second ear device.

According to the invention, the purpose of providing the user with a personal copy of his 3D ear data is to enable the user to use this personal copy for providing the manufacturer of a second ear device with the necessary 3D ear data without the need to have to again measure the shape of the user's ear, as it was necessary for producing the first ear device in the process of FIG. 1. Such a simplified process for producing a second ear device is schematically shown in FIG. 2.

As a first step the user will order the second ear device at the manufacturer. In general, the manufacturer of the second device may be the same as or different from the manufacturer of the first ear device. In the latter case it will be necessary that the data format standard defined for the 3D ear data of the personal copy 18 is accepted as an industrial standard or that procedures are publicly known for translating the data formats of the various manufacturers into each other. The second ear device in general may be desired as a copy of the first ear device, for example, for replacing the first ear device if lost or severely damaged, or it may be of the same type but with different desired functions, such as a hearing protection earplug which is to be used under different noise and/or communication conditions than the first earplug (in this case, the use data for the second earplug would be different from that for the first earplug), or it may be of a different type than the first ear device, for example, with the first ear device being a hearing protection earplug and the second ear device being a hearing aid.

Together or subsequent to the order, the user will transmit his 3D ear data, based on his personal copy 18, and his use data to the manufacturer of the second ear device. As already mentioned, the use data may or may not differ from the use data for the first ear device. In the latter case, if the manufacturer of the first and the second ear device is the same, it will not be necessary to transmit the use data, if the use data is still stored in a database accessible by the manufacturer. Based on the use data and the 3D ear data provided by the user, the second ear device will be manufactured in the same or a similar manner as the first ear device, with a product 12' being delivered to the user, comprising, for example, two hearing protection earplugs 14' connected by a cord 16'.

A further aspect of the invention relates to the problem that the inner shape of a person's outer ear and ear canal undergoes changes due to aging of the person. Such aging changes may create problems for the fit of customized retention elements of ear devices if significant time has passed since the shape of the user's ear has been measured. In such cases, i.e. when significant time has passed from the date when the user's ear shape was measured until an ear device with a customized retention element is to be manufactured, the actual shape of the user's ear will more or less differ from the previously measured shape due to aging processes.

Hence, if the customized retention element would be produced, in order to avoid a new measurement of the user's ear, on the previous measurement data, the fit of the retention element within the outer ear and/or ear canal might be less than optimized due to the potential mismatch of the actual shape of the user's ear and the customized outer shape of the retention element which has been modeled based on old ear shape data.

This mismatch problem may be overcome by taking into account the aging-induced changes of the ear shape having occurred since the ear shape was last measured. This can be achieved by establishing a model based on statistical aging data in order to estimate changes of the ear anatomy of the user caused by aging in order to estimate the actual shape of the user's ear by taking into account, based on that model, the time having passed since the shape of the user's ear was last measured, and using the estimated actual shape of the user's ear rather than the measured shape of the user's ear when manufacturing the customized retention element.

Statistical data regarding changes of ear anatomy caused by aging, which are basic to the aging model, may be sampled by repeatedly measuring the shape of the outer ear and ear canal of persons other than the user. However, preferably, if possible, in addition statistical data is sampled by repeatedly measuring the shape of the outer ear and ear canal of the user over a certain time period.

Rather than replacing the measured shape of the user's ear by the estimated actual shape of the user's ear in the manufacturing process, the estimated actual shape of the user's ear as determined from an aging model may be compared with the measured shape of the user's ear and, if it is found that the deviation between the measured shape of the user's ear and the estimated actual shape of the user's ear fulfills a predefined condition, the user may be provided with a alert in order to remind him that the shape of his outer ear and ear canal has to be re-measured. In this case, the user would be aware that, if he intends to order a new ear device, he should first have his ear shape re-measured, since the previously measured ear shape according to his personal copy 18 is no longer reliable, so that the new ear device could be manufactured based on the re-measured shape of the user's ear. The use of an aging model is particularly useful for manufacturing a new, i.e. a second, third etc., hearing device, but it may be also used for manufacturing the first ear device if too much time has passed at the date of the manufacturing process since the ear shape was measured.

An implementation of an aging model is schematically shown for the manufacturing processes of FIGS. 1 and 2.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as encompassed by the scope of the appended claims.

What is claimed is:

1. A method for manufacturing an ear device having a retention element to be worn at least in part in at least one of an outer ear and an ear canal of a user, comprising:
   measuring an inner shape of said user's outer ear and ear canal;
   sampling statistical data regarding changes of ear anatomy caused by aging;
   establishing a model based on said statistical aging data for estimating changes of ear anatomy of said user caused by aging;
   estimating from said model an actual inner shape of said user's outer ear and ear canal based on said measured inner shape of said user's outer ear and ear canal by taking into account a time interval having passed since said measured shape of said user's outer ear and ear canal was measured; and
   using said estimated actual shape of said user's outer ear and ear canal for providing said user with said retention element, wherein an outer surface of said retention element is individually shaped according to an inner shape of said user's outer ear and ear canal.

2. The method of claim 1, wherein, for providing said user with said retention element, said retention element is manufactured based on said estimated actual shape of said user's outer ear and ear canal, wherein said outer surface of said retention element is individually shaped according to said estimated actual inner shape of the user's outer ear and ear canal.

3. The method of claim 1, further comprising, for providing said user with said retention element:
   comparing said estimated actual shape with said measured shape and providing said user with an alert, if it is found that the deviation between said measured shape of said user's outer ear and ear canal and said estimated actual shape of said user's outer ear and ear canal fulfils a predefined condition.

4. The method of claim 3, wherein said alert is to remind said user to have the shape of the user's outer ear and ear canal re-measured;
   further comprising, for providing the user with said retention element:
   re-measuring the inner shape of the user's outer ear and ear canal; and
   manufacturing said retention element based on said re-measured shape of the user's outer ear and ear canal, wherein an outer surface of said retention element is individually shaped according to said re-measured inner shape of said user's outer ear and ear canal.

5. The method of claim 1, wherein said statistical data is sampled by repeatedly measuring said inner shape of said user's outer ear and ear canal over a time period.

6. The method of claim 1, wherein said statistical data is sampled by repeatedly measuring an inner shape of an outer ear and ear canal of persons other than said user.

* * * * *